United States Patent
Waite

[11] 3,826,173
[45] July 30, 1974

[54] METHOD AND APPARATUS FOR CUTTING WORM WHEELS

[76] Inventor: Langford Horace Waite, 3213 Napean Hwy., Sorrento, Victoria, Australia

[22] Filed: Aug. 16, 1972

[21] Appl. No.: 280,951

[30] Foreign Application Priority Data
Sept. 3, 1971  Australia............................ 6157/71

[52] U.S. Cl. .................................................. 90/4
[51] Int. Cl. ........................................... B23f 11/00
[58] Field of Search ........................................ 90/4, 3

[56] References Cited
UNITED STATES PATENTS

| | | |
|---|---|---|
| 219,892 | 9/1879 | Albro .................................. 90/4 |
| 611,277 | 9/1898 | Reinecker ............................ 90/4 |
| 858,081 | 6/1907 | Liggett ................................ 90/4 |
| 1,406,001 | 2/1922 | Gleason .............................. 90/3 |
| 1,641,666 | 9/1927 | Edgar .................................. 90/4 |

Primary Examiner—Andrew R. Juhasz
Assistant Examiner—Z. R. Bilinsky
Attorney, Agent, or Firm—Harold L. Stowell

[57] ABSTRACT

Worm wheels are formed from cylindrical blanks mounted on opposite sides of a cutter in the shape of a worm with a tapered end fluted to provide cutting edges. The cylindrical blanks are keyed or splined on parallel shafts fixed to corresponding worm wheels engaging on opposite sides of a worm. The cutter and the worm are driven concurrently and the cutter is advanced between the cylindrical blanks to cut teeth in the peripheral surfaces thereof.

5 Claims, 7 Drawing Figures

PATENTED JUL 30 1974

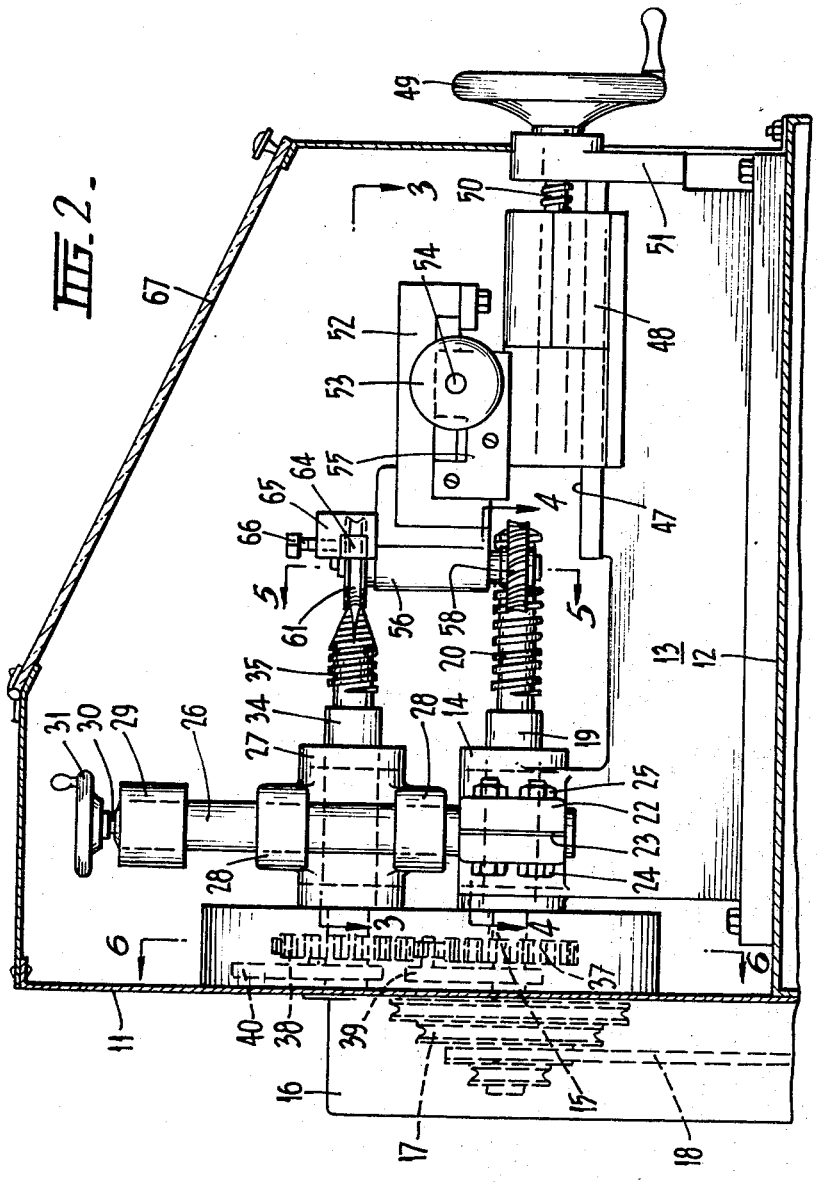

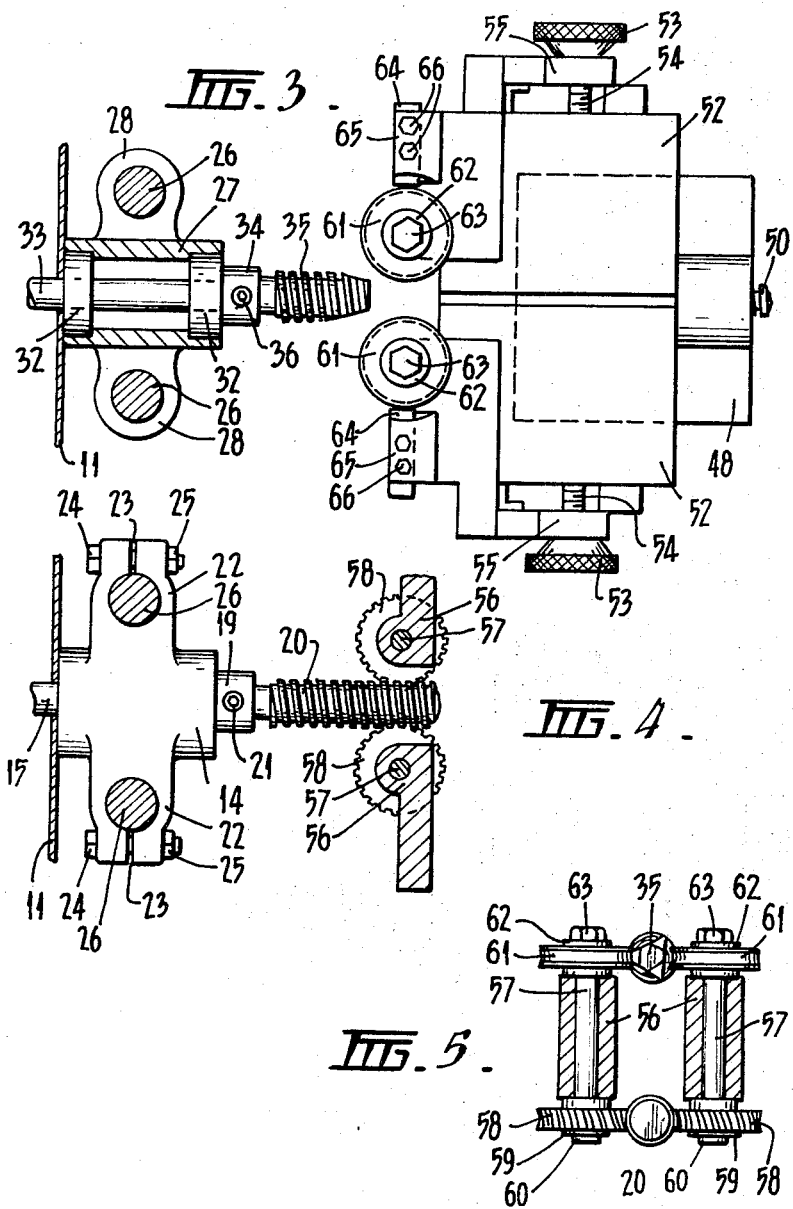

METHOD AND APPARATUS FOR CUTTING WORM WHEELS

This invention relates to a method and apparatus for cutting worm wheels and is concerned more particularly with a new method and apparatus particularly suitable for producing large quantities of worm wheels of the same specifications or in a situation where smaller quantities of the same specifications may be required at regular intervals.

The invention provides a number of advantages over the conventional method of hobbing worm wheels. These include more rapid production, ability to make use of relatively unskilled labour once initial setting up has been carried out, stronger, simpler and more durable cutting tools, greater precision in the form of the worm wheel with resultant better meshing characteristics with a worm, generally better geometry of the product, and lower tooling costs for high production.

With the above objects in view a method of producing worm wheels in accordance with the invention broadly resides in disposing a master worm and a master worm wheel in meshing engagement with each other, disposing a cutter in conjunction with the master worm for rotation concurrently with it, mounting a worm wheel blank in conjunction with the master worm wheel for rotation concurrently with it and in a position to co-act with the cutter, and effecting simultaneous relative advancement of the master worm wheel and the worm wheel blank to the master worm and the cutter in the direction of the axes of the said master worm and cutter.

Apparatus according to the invention broadly comprises a master worm and a master worm wheel in meshing engagement with each other, means for mounting a cutter which corresponds in shape to the master worm and which is provided with a taper and flutes to provide cutting edges thereon, means for driving said cutter mounting means whereby said cutter rotates concurrently with the master worm, means for mounting a worm wheel blank for rotation concurrently with the master worm wheel in a position to co-act with the cutter, and means for effecting simultaneous relative advancement of the master worm wheel and the worm wheel blank towards the master worm and the cutter mounting means in the direction of the axes thereof.

Preferably the invention involves disposing the master worm and the cutter supporting means with their axes parallel to each other, and mounting the worm wheel blank and the master worm wheel for rotation about a common axis and effecting relative advancement while simultaneously rotating the master worm and the supporting means for the cutter. The invention contemplates rotating the cutter in the same direction as the master worm, in which case the cutter is of the same hand as the master worm, but it also envisages driving the cutter in the reverse direction in which case the cutter is of opposite hand to the master worm, and in this case the invention produces a worm wheel of opposite hand to the master worm wheel.

Preferably means are provided for ready adjustment to enable worm wheels of different diameter to be formed and for worm wheels to be formed to mesh with worms of different diameter and other characteristics.

According to a particular feature of the invention two master worm wheels may be disposed, one at each side of the master worm, and two worm wheel blanks may be mounted for co-ordinated movement with the respective master worm wheels, the said blanks being at opposite sides of the path of movement of the worm wheel cutter.

Other objects and features of the invention will be apparent from the following description of a preferred form thereof. In this description reference is made to the accompanying drawings in which:

FIG. 2 is an enlarged view in section through an upper part of the apparatus,

FIG. 3 is a view in section in the plane 3—3 of FIG. 2,

FIG. 4 is a view in section in the plane 4—4 of FIG. 2,

FIG. 5 is a view in section in the plane 5—5 of FIG. 2,

Figure 1:
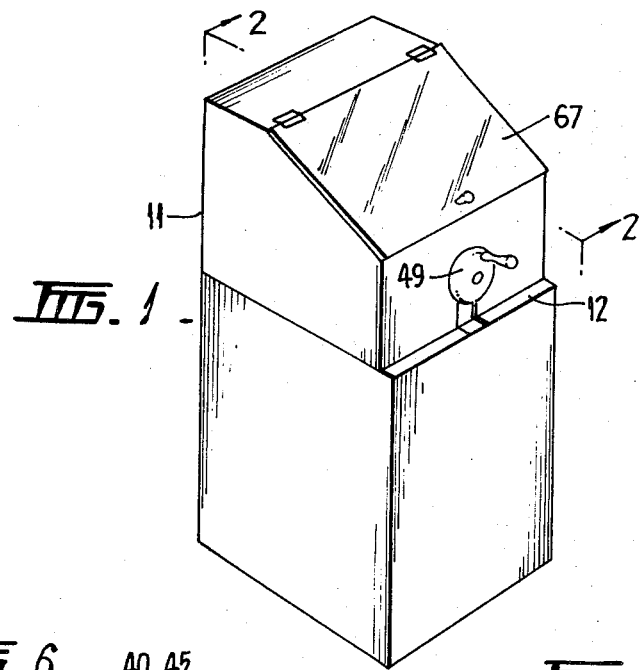
FIG. 1 is a perspective view of apparatus according to the invention.

The drawings illustrate apparatus comprising a frame 11 the lower part of which houses a motor (not shown) and the upper part of which is shown in section in greater detail in FIG. 2. As seen in the latter Figure the frame 11 includes a horizontal plate 12 on which there is mounted a bed 13. The rear end of the bed 13 is raised and enlarged to form a boss 14 in which a shaft 15 is mounted in suitable bearings (not shown). The shaft 15 projects longitudinally from the rear of the frame 11 within a cover 16 and has fixed to it a stepped pulley 17. A belt 18 extends upwardly over the stepped pulley 17 from a pulley on the drive motor, and thus the shaft 15 can be driven at a selected speed by operation of the motor. The forward end of the shaft 15 is formed as a socket 19 into which the end of a master worm 20 can be fitted and secured by a set screw 21. Other means such as a quick-acting chuck may be used in place of the socket 19 and set screw 21, and other forms of drive means may be used between the motor and the shaft 15.

The boss 14 has two wings 22 projecting laterally one to each side, and as indicated in FIG. 4 each of these has a cylindrical hole bored vertically in it with a slot 23 opening from the hole to the outer edge. A bolt 24 secured by a nut 25 extends through the material of the wing whereby two cylindrical posts 26 engaged in the cylindrical cavities may be gripped firmly in the respective wings by tightening the nuts 25 on the bolts 24. The posts 26 extend vertically parallel to each other and provide a mounting for a bracket 27 which is shown partly in section in FIG. 3. The said bracket 27 has wings 28 which are suitably bored to fit the posts 26 whereby the bracket 27 can slide vertically.

The upper ends of the posts 26 are connected together by a bridge 29 and a shaft 30 carrying a hand wheel 31 extends downwardly through the bridge 29 to the bracket 27. Although not shown in the drawings the lower end of the shaft 30 is screw-threaded to engage in a correspondingly screw-threaded socket in the bracket 27 so that by turning the hand wheel 31 the bracket 27 can be raised and lowered to a limited extent. Preferably the threaded portion of the shaft 30 also carries a lock-nut whereby after setting the height of the bracket 27 the lock-nut can be tightened to avoid accidental displacement.

The bracket 27 carries two bearings 32 in which a shaft 33 is mounted. The forward end of the shaft 33 carries a socket 34 similar to the socket 19 and provided for the purpose of engaging a cutter 35 held in place by a set screw 36. Again, other means such as a quick-acting chuck may be used in place of the socket 34 and set screw 36.

Figures 6, 7:
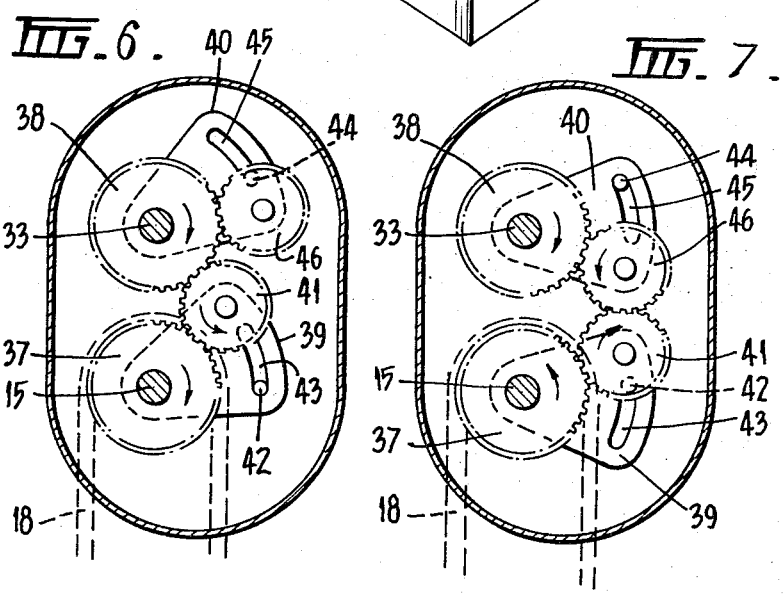
FIG. 6 is a view in section in the plane 6—6 of FIG. 2.
FIG. 7 is a view similar to FIG. 6 showing a different arrangement of the drive mechanism for the cutter holder.

The shaft 15 carries a spur gear 37 between the pulley 17 and the boss 14 and a similar spur gear 38 is mounted on the shaft 33. The two spur gears 37 and 38 are mounted in the same plane but the distance between them is greater than that required for them to mesh together. As best illustrated in FIGS. 6 and 7 each of the shafts 15 and 33 carries a sector plate 39 and 40 respectively. The lower sector plate 39 carries a smaller spur gear 41 which is in constant mesh with the gear 37 and which can be brought into mesh with the gear 38 in the uppermost position of the sector plate 39. The position of the sector plate 39 is controlled by a bolt 42 passing through a slot 43 in the sector plate 39 and capable of being tightened to hold the sector plate in the desired position. When the bolt 42 is loosened the sector plate 39 can be dropped from the position shown in FIG. 6 to that shown in FIG. 7. The position of the sector plate 40 is also controlled by a bolt 44 passing through a slot 45. It also carries a spur gear 46 which is in constant mesh with the gear 38. In the position shown in FIG. 6 the gear 46 is raised out of contact with the gear 41. When the sector plate 39 is lowered to the position shown in FIG. 7 the sector plate 40 can also be lowered as shown in the latter Figure so as to bring the gear 46 in mesh with the gear 41. It will be evident that with the arrangement shown in FIG. 6 the shaft 15 drives the shaft 33 concurrently with it in the same direction whereas with the arrangement of FIG. 7 the shaft 15 again drives the shaft 33 concurrently with it, but in the opposite direction.

The bed 13 extends forwardly to the front of the frame and has a machined horizontal surface 47 with laterally extending parallel edges and serving to support a sliding block 48 for horizontal longitudinal movement. Movement of the said block is controlled by means of a hand wheel 49 connected to a screw-threaded shaft 50 which is entered into an appropriately screw-threaded hole in the block 48. The forward end of the shaft 50 is supported in bearings in a trunnion 51 at the front end of the bed 13.

The block 48 supports two upper blocks 52 each of which is mounted on the block 48 on suitable guides so as to be capable of sliding in the horizontal lateral direction. Movement of each upper block 52 is controlled by means of a knurled knob 53 attached to a screwed shaft 54 supported in a bracket 55 attached to the block 48 and passing into an appropriate screw-threaded hole in the block 52. Thus by turning the respective knobs 53 the upper blocks 52 can be moved towards or away from each other.

Each block 52 has an integral boss 56 in which a shaft 57 is mounted in suitable bearings with its axis extending vertically. The lower end of each shaft 57 projects beyond the lower edge of the boss 56 and is splined, keyed or otherwise constructed to receive a master worm wheel 58 held in place by a washer 59 and screw 60. As indicated by FIG. 2 the location of the master worm wheel 58 is such that its central plane passes through the axis of the master worm 20. It is to be understood that in practice the master worm 20 and the two master worm wheels 58 on each side of it are designed to mesh with each other, and after the worm wheels have been fitted the positions of the upper blocks 52 are adjusted in order to bring the master worm wheels 58 into the correct position for proper meshing engagement with the master worm 20.

The upper ends of the shafts 57 project above the bosses 56 and are again splined, keyed or otherwise shaped to provide a driving connection to worm wheel blanks 61 which are fitted one on each of the shafts 57 and held in place by washers 62 and screws 63. Having fitted a pair of worm wheel blanks 61 in position and fitted to the socket 34 an appropriate cutter 35, the height of the bracket 27 is then adjusted if necessary by means of the hand wheel 31 so that the axis of the cutter 35 is in the central plane of the two worm wheel blanks.

The apparatus further includes in conjunction with each of the worm wheel blanks a trimming tool 64 extending in a holder 65 integral with the respective upper block 52 and held in position by screws 66. The trimming tools are formed of or tipped with tool steel and are appropriately convex at their ends to suit the concavity of the worm wheel blanks. Their function is to remove material which might be left standing proud of the concave surface as a result of the operation of the cutter 35.

The apparatus may further include a shield disposed below the cutter 35 and above the master worm 20 and master worm wheels 58 in order to avoid chips from the operation of the cutter falling onto them and preventing their proper operation.

The frame 11 is constructed to completely enclose the apparatus, apart from the hand wheel 49, and a transparent cover 67 is hinged so that it can be lifted to change the worm wheel blanks and to adjust the other parts of the apparatus, and also so that the functioning of the apparatus can be observed.

In operation, after a pair of worm wheel blanks have been set in position and the apparatus is adjusted, the motor is set in operation and the hand wheel 49 is operated to move the block 48 rearwardly. In this operation the master worm wheel 58 and the master worm 20 continue to remain in mesh so that the shafts 57 are turned comparatively slowly. As the worm wheel blanks move into engagement with the cutter 35 the latter commences to cut into the concave peripheral surface of each worm wheel blank thus commencing to form the teeth thereof. If the hand wheel 49 is kept stationary at any position the worm wheel blanks continue to turn and thus the depth of cut can be regulated by varying the rate at which the hand wheel 49 is turned.

If desired instead of utilising a manual feed with the hand wheel 49 the movement of the block 48 may be carried out automatically by means of an independent drive or by means of suitable gear and/or belt lever from the motor which drives the master worm and cutter.

It will be evident that for proper operation the master worm 20 should be of somewhat greater length than is necessary purely for meshing with the master worm wheels and preferably at least double the length which would normally be sufficient for this purpose.

A particular advantage of the preferred form of the invention illustrated, utilising the worm wheels and blanks at opposite sides of the master worm wheel and the cutter is that the forces applied from each side on the cutter are equalised so that there is no appreciable tendency for the cutter to be deflected from its correct axial alignment. Thus the formation of the teeth in the worm wheel blanks is extremely accurate.

I claim:

1. A method of producing a worm wheel which comprises disposing a master worm and a first master worm wheel in meshing engagement with each other, disposing a second master worm wheel in meshing engagement with the master worm, the first and second master worm wheels being coplanar with each other, disposing a cutter in conjunction with the master worm for rotation concurrently with it, mounting a first worm wheel blank in conjunction with the first master worm wheel for rotation concurrently with it and in a position to coact with the cutter, mounting a second worm wheel blank in conjunction with the second master worm wheel for rotation concurrently with it in a position to coact with the cutter at the opposite side thereof from the first worm wheel blank, rotating the master worm and the cutter about their axes and effecting simultaneous relative advancement of the first and second master worm wheels and the first and second worm wheel blanks to the master worm and the cutter in the direction of the axes of said master worm and cutter whereby the cutter forms teeth on the first and second worm wheel blanks.

2. A method according to claim 1 in which the first master worm wheel and the first worm wheel blank are disposed in axial alignment with each other, the second master worm wheel and the second worm wheel blank are disposed in axial alignment with each other, and the master worm and cutter are disposed with their axes parallel to each other.

3. Apparatus for cutting worm wheels comprising a master worm and a master worm wheel in meshing engagement with each other, means for mounting a cutter which corresponds in shape to the master worm and which is provided with a taper and flutes to provide cutting edges thereon, means for driving said cutter mounting means whereby said cutter rotates concurrently with the master worm, means for mounting a first worm wheel blank for rotation concurrently with the master worm wheel in a position to coact with the cutter, means for mounting a second worm wheel blank for rotation concurrently with the master worm wheel in a position to coact with the cutter, with the axes of the first and second worm wheel blanks parallel to each other and the axis of the cutter driving means extending between them, and means for effecting simultaneous relative advancement of the master worm wheel and the first and second worm wheel blanks towards the master worm and the cutter mounting means in the direction of the axes thereof.

4. Apparatus for cutting worm wheels comprising rotary mounting means for a cutter formed in the shape of a worm having cutting edges formed by flutes in a tapered end thereof, a master worm disposed with its axis parallel to that of the rotary mounting means, means for driving the rotary mounting means and the master worm concurrently with each other at the same speed, a first master worm wheel disposed for meshing engagement with the master worm with the axis of the said first master worm wheel parallel to a plane containing the axes of the rotary mounting means and the master worm, a second master worm wheel disposed for meshing engagement with the master worm at the opposite side thereof from the first master worm wheel, the axis of said second master worm wheel being parallel to the axis of the first master worm wheel, means for mounting a first worm wheel blank coaxially with the first master worm wheel and fixed relative to it with the axis of the rotary mounting means lying in the medial plane of the first worm wheel blank, means for mounting a second worm wheel blank coaxially with the second master worm wheel and fixed relative to it with the medial plane of the second worm wheel blank coincident with that of the first worm wheel blank, the said second master worm wheel being constrained not to move in the direction of the axis of the master worm relative to the first master worm wheel, and means for moving the first and second master worm wheels and the first and second worm wheel blanks relative to the master worm and the rotary mounting means in the direction of the axes of the master worm and the rotary mounting means.

5. Apparatus according to claim 4 including means to adjust the spacing between the master worm and the rotary mounting means, and means to adjust the distances between the axes of the master worm wheel and the master worm axis.

* * * * *